United States Patent
Firdaus

(10) Patent No.: US 6,926,092 B2
(45) Date of Patent: *Aug. 9, 2005

(54) HYDRAULIC TILLER ASSEMBLY

(75) Inventor: Usman Firdaus, Strongsville, OH (US)

(73) Assignee: MTD Products Inc., Valley City, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 10/394,634

(22) Filed: Mar. 21, 2003

(65) Prior Publication Data

US 2004/0194984 A1 Oct. 7, 2004

(51) Int. Cl.$^7$ .............................................. A01D 33/02
(52) U.S. Cl. ........................................ 172/71; 172/518
(58) Field of Search .............................. 172/63, 68, 71, 172/122, 123, 518, 540, 554

(56) References Cited

U.S. PATENT DOCUMENTS

| | | | |
|---|---|---|---|
| 3,866,552 A | * | 2/1975 | Leidig ........................ 111/161 |
| 3,982,482 A | | 9/1976 | Webb et al. |
| 3,983,943 A | * | 10/1976 | van der Lely ................ 172/47 |
| 4,227,580 A | * | 10/1980 | van der Lely et al. ...... 172/112 |
| 4,237,983 A | | 12/1980 | Allen |
| 4,286,670 A | | 9/1981 | Ackerman |
| 4,321,969 A | | 3/1982 | Wilson |
| 4,359,831 A | * | 11/1982 | Beeley ........................ 37/258 |
| 4,412,588 A | * | 11/1983 | van der Lely et al. ........ 172/68 |
| 4,492,271 A | * | 1/1985 | Doering ........................ 172/43 |
| 4,519,459 A | | 5/1985 | Reaume |
| 4,535,647 A | | 8/1985 | Gault |
| 4,556,113 A | | 12/1985 | Saito et al. |
| 4,567,689 A | * | 2/1986 | Lemons ........................ 47/1.7 |
| 4,585,071 A | | 4/1986 | Anderson et al. |
| 4,611,669 A | | 9/1986 | Ballard |
| 4,615,395 A | | 10/1986 | Nagamine |
| 4,700,794 A | | 10/1987 | Bernhagen et al. |
| 4,834,215 A | | 5/1989 | Smeal |
| 5,180,320 A | | 1/1993 | Calamia et al. |
| 5,524,711 A | * | 6/1996 | Harris ......................... 172/67 |
| 5,659,984 A | * | 8/1997 | Haug ........................... 37/219 |
| 6,041,584 A | * | 3/2000 | Hohnl ......................... 56/17.2 |
| 6,354,382 B1 | | 3/2002 | Jarman et al. |
| 6,467,550 B1 | * | 10/2002 | Firdaus ........................ 172/68 |

* cited by examiner

Primary Examiner—Robert E. Pezzuto
Assistant Examiner—Nathan Mammen
(74) Attorney, Agent, or Firm—Wegman Hessler & Vanderburg

(57) ABSTRACT

A tiller assembly includes a tine assembly that is rotatably connected to a tiller body and the tine assembly includes at least one tine for use in tilling associated soil. A hydraulic system is operatively connected to the tine assembly and includes a hydraulic pump, a hydraulic motor for use in rotating the tine assembly in first and second directions, a control valve, and hydraulic hose for use in communicating hydraulic fluid between the hydraulic pump, the hydraulic motor, and the control valve. The control valve may be positioned on-the-go into a first position thereby causing the tine assembly to rotate in a first direction and into a second position thereby causing the tine assembly to rotate in a second direction. The tiller assembly may also include a roller assembly that has a roller frame pivotably connected to the tiller body. The roller assembly also includes a roller that is rotatably connected to the roller frame and a spring for use in maintaining the roller against the soil. The roller has a contact surface for use in repacking the tilled soil. The spring permits the roller frame to move with respect to the tiller body.

2 Claims, 4 Drawing Sheets

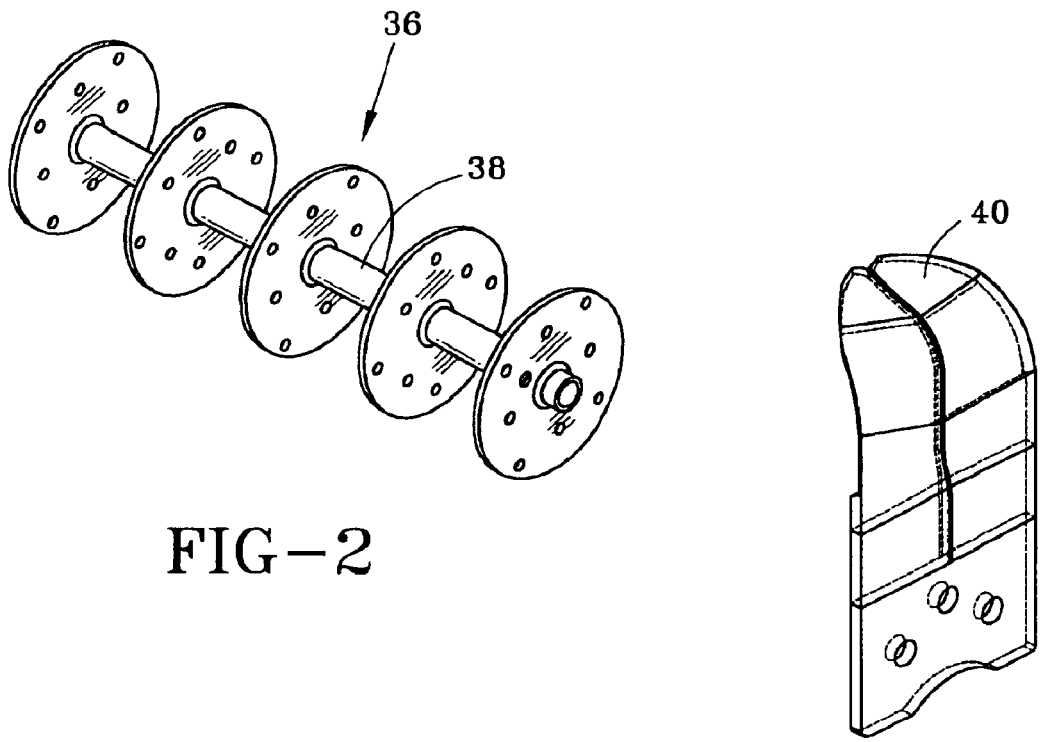
FIG-2
FIG-3
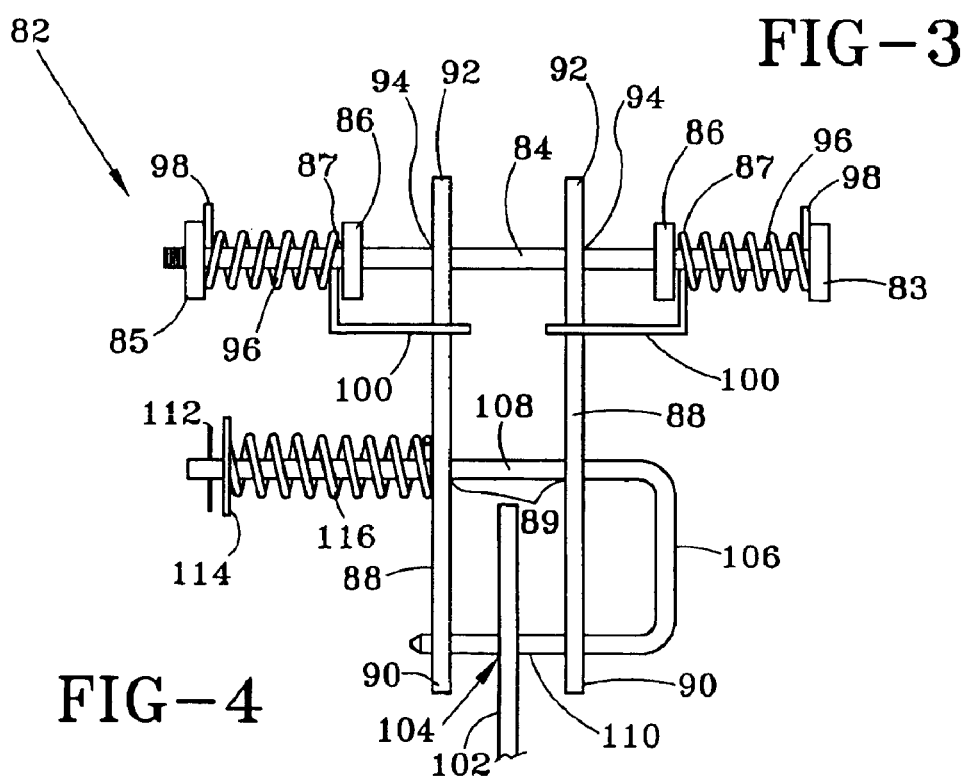
FIG-4

HYDRAULIC TILLER ASSEMBLY

BACKGROUND OF THE INVENTION

Petitioner hereby disclaims the terminal part of any patent granted on the instant application, which would extend beyond the expiration date of U.S. Pat. No. 6,467,550, as presently shortened by any terminal disclaimer. Petitioner hereby agrees that any patent so granted on the instant application shall be enforceable only for and during such period that it and the above listed patent are commonly owned. This agreement runs with any patent granted on the instant application and is binding upon the grantee, its successors, or assigns.

1. Field of Invention

This invention relates to the art of tilling soil, and more particularly to the art of a soil tiller having dual direction tines and a spring biased repacking roller.

2. Description of the Related Art

It is known to provide tillers for use in tilling (i.e., plowing or cultivating) soil in preparation for planting, for example. Some tillers have tines that can be rotated in two directions (dual direction tillers) to thereby provide two alternative types of tilling. It is also known to provide a tiller with a separate roller that lightly repacks tilled soil in order to prevent the tilled soil from being easily blown away by wind. These known tillers are generally effective in accomplishing their intended purpose. However, these known tillers have problems.

One problem in the art relates to dual direction tillers. Known dual direction tillers require either that the tiller unit itself be driven in two opposite directions (see U.S. Pat. No. 4,286,670, for example) or that the tiller axis with tines be manually detached from the tiller and then reattached with the tines placed in an opposite position. What is needed is a dual direction tiller that can be adjusted on-the-go between the dual directions by simply adjusting a single lever.

Another problem in the art relates to tillers having separate rollers. Known rollers are rigidly attached to the tiller. The problem is that when the roller contacts a large rock or other large obstacle lying on the ground, both the roller and the tiller are lifted away from the ground. This lifting will reduce the effectiveness of the tilling and may cause damage to the tiller. What is needed is a roller that is free to move relative to the tiller thereby maintaining the tiller tines in contact with the soil at all times.

The present invention provides methods and apparatuses for easily adjusting a dual direction tiller into two rotational directions on-the-go and for providing a separate roller that can be moved relative to the tiller. The difficulties inherit in the art are therefore overcome in a way that is simple and efficient, while providing better and more advantageous results.

SUMMARY OF THE INVENTION

According to one aspect of the present invention, a tiller assembly includes a tine assembly that is rotatably connected to a tiller body. The tine assembly has at least one tine for use in tilling associated soil. The tiller assembly also includes a hydraulic system that is operatively connected to the tine assembly. The hydraulic system includes a hydraulic pump, a hydraulic motor used to rotate the tine assembly in first and second directions, a control valve, and hydraulic fluid communication means for use in communicating hydraulic fluid between the hydraulic pump, hydraulic motor, and the control valve. The control valve is positionable on-the-go into first and second positions. The tine assembly rotates in the first direction when the control valve is positioned into the first position and the tine assembly rotates in the second direction when the control valve is positioned into the second position.

According to another aspect of this invention, a tiller assembly includes a tine assembly as well as a roller assembly. The roller assembly includes a roller frame that is pivotably connected to the tiller body, a roller that is rotatably connected to the roller frame, and biasing means for use in maintaining the roller against the associated soil. The roller includes a contact surface for use in repacking the soil once it has been tilled. The biasing permits the roller frame to move with respect to the tiller body.

One advantage of the present invention is that an operator can easily change the rotational direction of a dual direction tiller on-the-go from an operator seat.

Another advantage of the present invention is that a separate roller is free to move relative to the tiller thereby maintaining the tiller tines in contact with the soil when the roller is in contact with a large obstacle.

Still other benefits and advantages of the invention will become apparent to those skilled in the art upon a reading and understanding of the following detailed specification.

BRIEF DESCRIPTION OF THE DRAWINGS

The invention may take physical form in certain parts and arrangement of parts, a preferred embodiment of which will be described in detail in this specification and illustrated in the accompanying drawings which form a part hereof and wherein:

FIG. 2 is a perspective view of a tine assembly showing the tine axis.

FIG. 3 is a perspective view of one embodiment of a tine.

FIG. 4 is schematic representation of the biasing means of this invention showing the torsion springs and the U shaped pin that is used to attach the attachment brackets to the adjustment member.

DESCRIPTION OF THE PREFERRED EMBODIMENT

Figure 1:
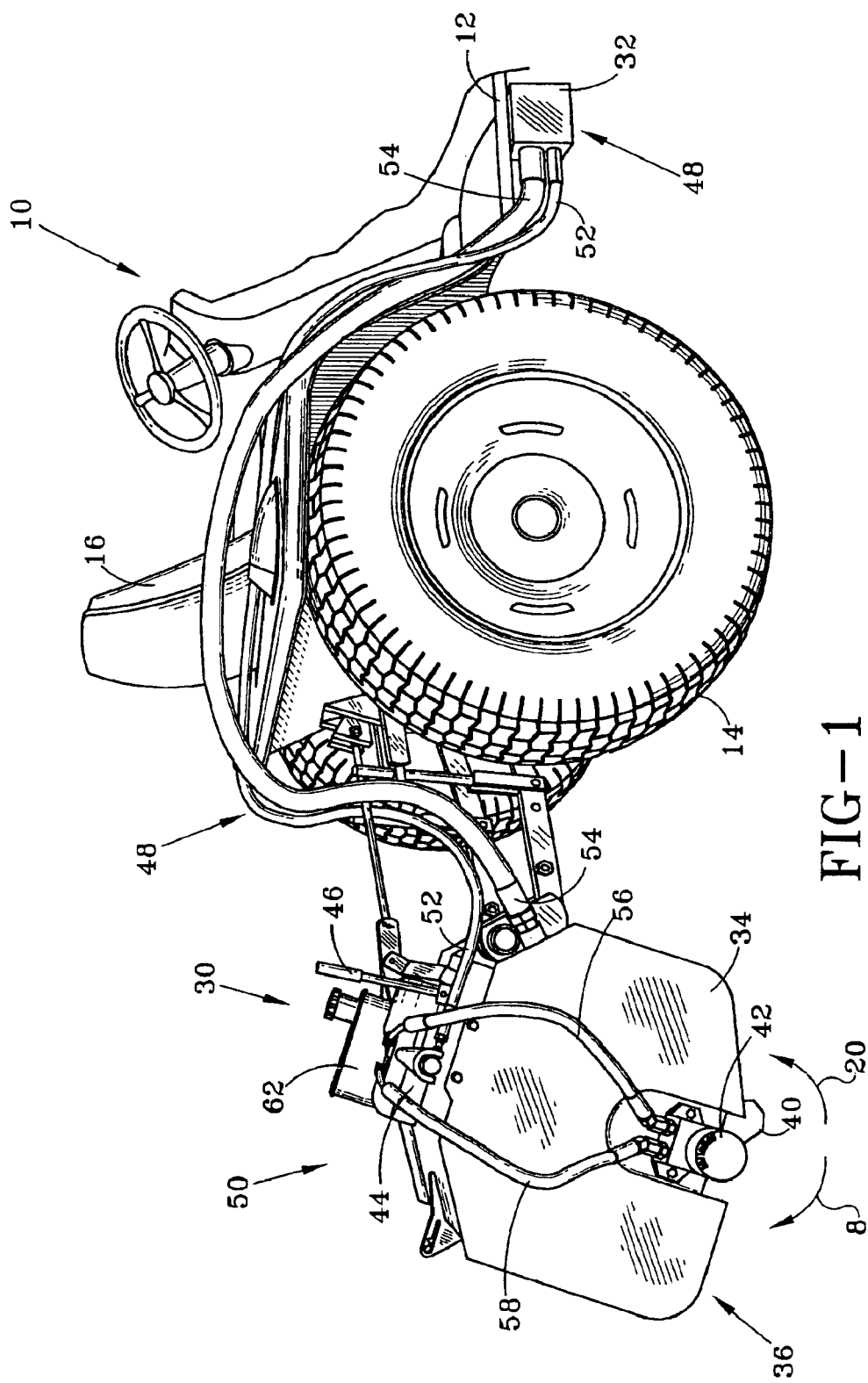
FIG. 1 is a side perspective partial view of a tractor connected to a tiller assembly.

Referring now to the drawings wherein the showings are for purposes of illustrating a preferred embodiment of the invention only and not for purposes of limiting the same, FIG. 1 shows a garden tractor 10 equipped with the present invention, a tiller assembly 30. Throughout this disclosure the inventive tiller assembly 30 is described and shown attached to the tractor 10 but the invention is also applicable for attachment to other vehicles, to stand alone tillers (no separate vehicle required) and other applications as well. The tractor 10 includes a frame 12 supporting a plurality of ground engaging wheels 14. The frame 12 may also support an operator seat 16 and an engine (not shown) as is well known in the art. In the preferred embodiment, the frame 12 also supports a hydraulic pump 32 that is driven by the engine. The operation of a hydraulic pump is well known in the art so it will not be discussed further. It should be noted, however, that the hydraulic pump 32 could alternatively be mounted to the tiller assembly 30 and driven by any means chosen with sound engineering judgment.

With reference now to FIGS. 1–3, the tiller assembly 30 includes a tiller body 34 that is operatively connected to the tractor frame 12 so that the tiller 30 can be pulled across the soil to be tilled (not shown) by the tractor 10. Any means of connecting the tiller body 34 to the tractor frame 12 chosen with sound engineering judgement may be used. In the preferred embodiment, however, a typical 3-hitch mount as shown in FIG. 1 is used. In this way the tiller assembly 30 may be raised and lowered relative to the ground by the tractor 10 as is commonly known in the art. The tiller assembly 30 includes a tine assembly 36 including a tine axis 38 and at least a first tine 40 connected to the tine axis 38. The tine assembly 36 is rotatably connected to the tiller body 34. As the tiller assembly 30 is moved across the soil to be tilled, the tine axis 38 is rotated causing the tines 40 to contact (and thereby till or cultivate) the soil. It should be noted that the number and type of tines 40 used may vary depending on the application. The tine 40 shown in FIG. 3 is merely representative. In the preferred embodiment, the tines 40 provide one type of tilling when the tine axis 38 is rotated in a first direction 18 and another type of tilling when the tine axis 38 is rotated in a second direction 20. Thus, for example, when the tine axis 38 is rotated in the first direction 18 the tines 40 may till the soil to a relatively heavier extent and when the tine axis 38 is rotated in the second direction 20 the tines 40 may till the soil to a relatively lighter extent. For another example, when the tine axis 38 is rotated in the first direction 18 the tines 40 may till the soil and when the tine axis 38 is rotated in the second direction 20 any soil that had lodged in the tines 40 may be removed.

Figure 5:
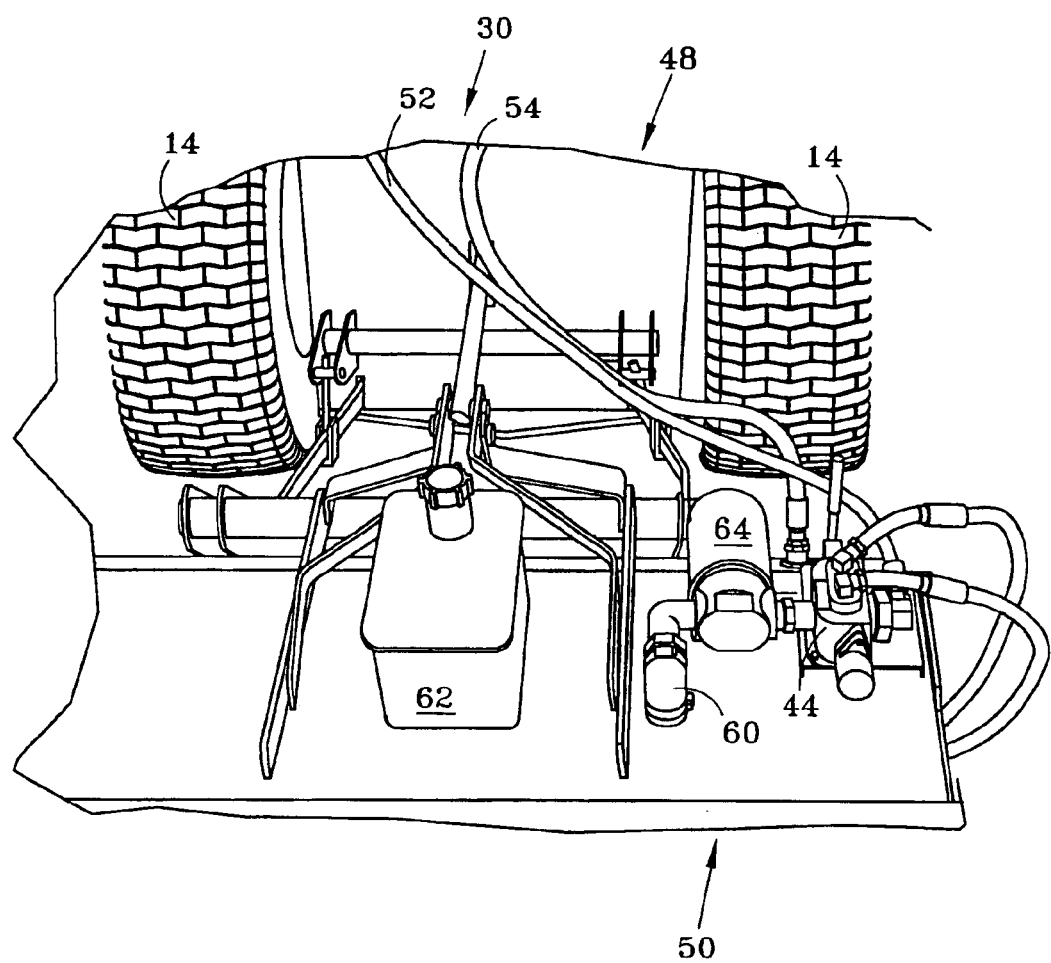
FIG. 5 is a partial perspective back view of the tiller assembly of FIG. 1 showing in greater detail the control valve.

With reference now to FIGS. 1 and 5, the tiller assembly 30 also includes a hydraulic system 50 used to selectively rotate the tine assembly 36 in the first and second directions 18, 20. The hydraulic system includes the previously mentioned hydraulic pump 32, a hydraulic motor 42 and a control valve 44. The hydraulic motor 42 is connected to the tine assembly 36, preferably at one end of the tine axis 38 as shown in FIG. 1, and causes the tine assembly 36 to rotate. The control valve 44 is preferably mounted to the tiller body 34 within a manually accessible range of the operator seat 16. By manually accessible range it is meant that the operator can reach and adjust the control valve 44 without having to leave the operator seat 16. The accessibility of the control valve 44 makes it easy to adjust the control valve 44 "on-the-go." By on-the-go it is meant that the control valve 44 can be adjusted while the tractor 10 is being operated. There is no need to stop the tractor, or to adjust the orientation of the tiller assembly 30, or to reposition the tine assembly 36 as is known in the art. It may be necessary for the operator to turn from facing the steering wheel toward facing the tiller body 34 to adjust the control valve 44. Although the control valve 44 can be of any type chosen with sound engineering judgment, in the preferred embodiment it is a two position valve and most preferably it is a three position valve. The two positions include a first position that causes the tine assembly 36 to rotate in the first direction 18 and a second position that causes the tine assembly 36 to rotate in the second direction 20. The third position is a neutral position where the tine assembly 36 does not rotate. Preferably, the control valve 44 includes a control lever 46 whereby the control valve 44 is manually adjustable into the first, second and third positions.

With continuing reference to FIGS. 1 and 5, hydraulic fluid communication means 48 is used to communicate hydraulic fluid between the hydraulic pump 32, the hydraulic motor 42 and the control valve 44. In the preferred embodiment, the hydraulic fluid communication means 48 uses hydraulic tubing or hose including supply and return lines 52, 54 between the hydraulic pump 32 and the rest of the hydraulic system 50. The supply line 52 carries hydraulic fluid from the hydraulic pump 32 to the control valve 44. The hydraulic fluid then travels, depending on the position of the control valve 44, either through a first motor line 56, a second motor line 58 or directly through an exit line 60. In the preferred embodiment, the hydraulic fluid communication means 48 also includes a fluid reservoir 62 mounted to (and preferably within) the tiller body 34 and a fluid filter 64. As shown in FIG. 5, the exit line 60 includes the fluid filter 64 and enters into the fluid reservoir 62 (beneath the outer surface of the tiller body 34). From the fluid reservoir 62 the hydraulic fluid is communicated through the return line 54 back to the hydraulic pump 32.

With reference to FIGS. 1–3 and 5, the operation of the tiller assembly 30 will now be discussed. To cause the tine assembly 36 to rotate in the first direction 18, the operator simply positions the control lever 46 of the control valve 44 into the first position. This causes the hydraulic motor 42 to rotate the tine assembly 36 in the first direction 18. To cause the tine assembly 36 to rotate in the second direction 20, the operator simply positions the control lever 46 of the control valve 44 into the second position. As noted above, this adjustment can be made on-the-go while the tractor 10 is being operated. This causes the hydraulic motor 42 to rotate the tine assembly 36 in the second direction 20. To prevent the tine assembly from rotating in either direction, the operator simply positions the control lever 46 into the third (neutral) position. This prevents the hydraulic motor 42 from rotating the tine assembly 36 in any direction. Most preferably the third, neutral position occurs when the control lever 46 is positioned mid-way between the first and second positions.

Figure 6:
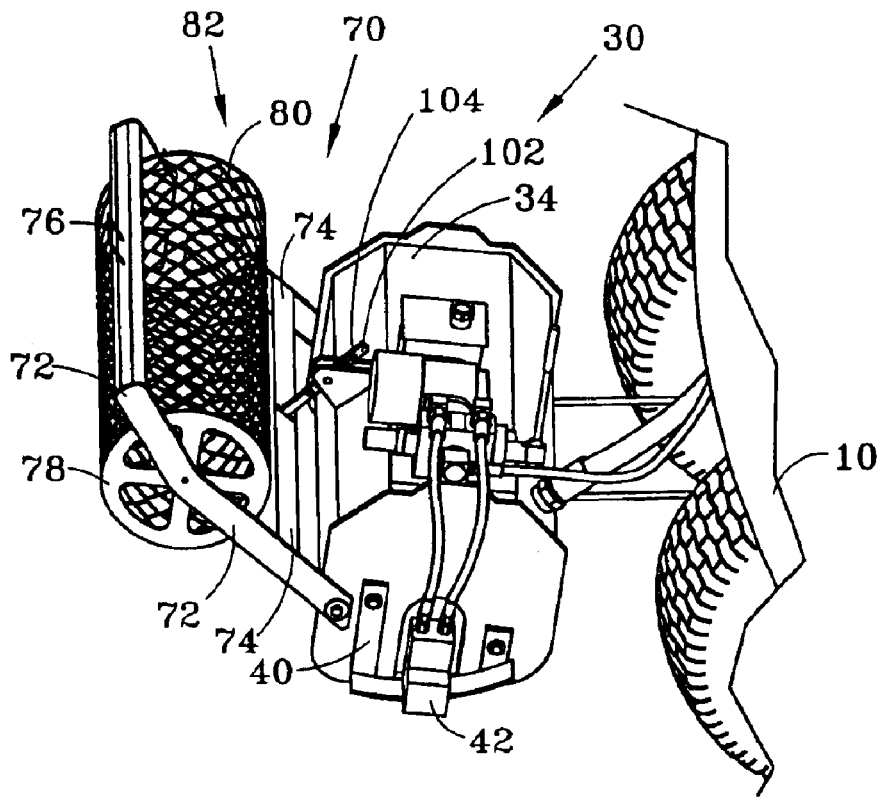
FIG. 6 is a perspective side view of another tiller assembly this time with an attached roller assembly.
Figure 7:
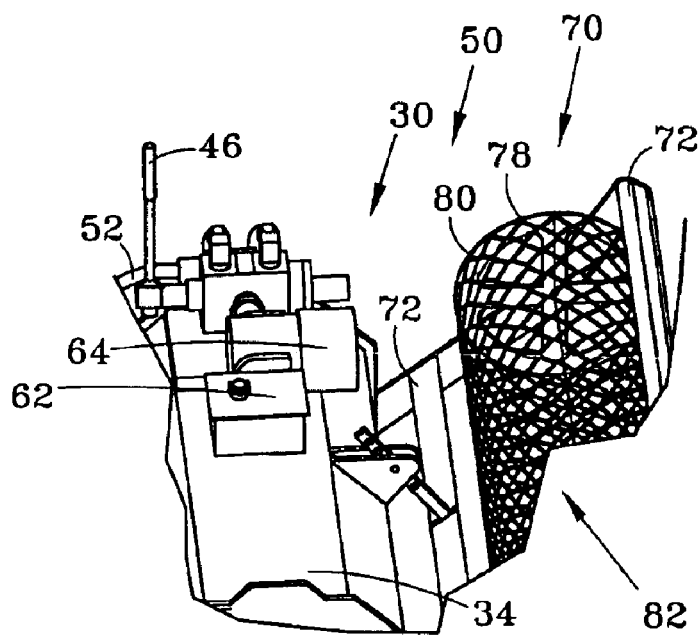
FIG. 7 is close up perspective view of the tiller assembly and the roller assembly of FIG. 6 showing the contact surface of the roller.

With reference now to FIGS. 6–7, another tiller assembly embodiment is shown. This tiller assembly 30 is essentially identical to the previously described tiller assembly 30 (shown in FIGS. 1 and 5) with the addition of a roller assembly 70. Therefore, the similar components are numbered consistently with the previously described components. The roller assembly 70 includes a roller frame 72 that is operatively connected to the tiller body 34. In the preferred embodiment, the roller frame 72 is pivotably connected to the tiller body 34 using a pair of frame brackets 74 at opposite ends of the roller assembly 70 as shown in FIG. 6. In this way the roller assembly 70 can be positioned to engage the soil or positioned above the soil when its use is not required. A roller handle 76 may be attached to the roller frame 72 whereby the operator can make these position adjustments. The pivotable connection is also important in combination with a biasing means 82 discussed below. The roller assembly 70 also includes a roller 78 that is rotatably connected to the roller frame 72. In other words, the roller 78 rotates with respect to the roller frame 72 when the roller 78 is pulled across the soil. The roller 78 has a contact surface 80 for use in repacking tilled soil to prevent the wind from blowing away the soil. The particular design of the contact surface 80 can be of any type chosen with sound engineering judgment.

With continuing reference to FIGS. 6–7, the roller assembly 70 also includes biasing means 82 for use in biasing (maintaining) the contact surface 80 of the roller 78 against the soil. The biasing means 82 also permits the roller frame 72 and roller 78 to move with respect to the tiller body 34. The advantage of the biasing means 82 is realized when, for example, a large obstacle, such as a large rock (not shown), is engaged thereby exerting a force upon the tiller assembly 30 and roller assembly 70. Without the biasing means 82, when the contact surface 80 of the roller 78 contacts the large rock, the roller 78, roller frame 72 and tiller body 34 are all lifted off the soil to a height equal to the height of the large rock. This lifting causes the tines 40 to also lift from the soil and thereby creates an area of soil that is not properly tilled. With the biasing means 82, however, when the contact surface 80 of the roller 78 contacts the large rock, the roller 78 and roller frame 72 move (pivot) with respect to the tiller body 34 as the biasing means 82 is compressed. Thus, while the roller 78 and roller frame 72 are lifted off the soil to a height equal to the height of the large rock, the tines 40 are not lifted at all and are thus permitted to remain engaged with the soil. In this way, no area of soil is un-tilled.

With reference now to FIGS. 4 and 6–7, the preferred biasing means 82 includes a pivot rod 84 mounted to the tiller body 34. The pivot rod 84 may be any cylindrically shaped rod chosen with sound engineering judgment but preferably is a bolt having a head 83 at one end and a threaded shaft that receives a nut 85 at the opposite end. The pivot rod 84 may be received within the apertures 87 of a pair of eyelets 86 that are fixedly attached to and extend from the tiller body 34. At least one, preferably two, attachment brackets 88 are used too operatively connect the pivot rod 84 to the roller frame 72. Thus, each attachment bracket 88 has a first end 90 operatively connected to the roller frame 72 and a second end 92 having a hole 94 that rotatably receives the pivot rod 84. The preferred biasing means 82 also includes at least one, preferably two, torsion springs 96 that receive the pivot rod 84. Each torsion spring 96 has a first end 98 that rests against the tiller body 34 and a second end 100 that that rests against the attachment bracket 88 as seen best in FIG. 4. An adjustment member 102 is operatively (preferably pivotably) connected to the roller frame 72. The adjustment member 102 preferably has a plurality of openings 104 that provide for a plurality of positions that the roller assembly 70 can be adjusted into with respect to the tiller body 34. A pin 106, that is preferably U-shaped, is used to connect the adjustment member 102 to the attachment brackets 88. The pin 106 has a first leg 108 that is rotatably received within pin holes 89 in the attachment brackets 88 and a second leg 110 that is selectively received within additional pin holes 89 and any one of the plurality of openings 104 in the adjustment member 102. Preferably, a cotter pin 112 and a washer 114 hold a tension spring 116 to the first leg 108 of the pin 106. This spring 116 will bias the pin 106 into engagement with the adjustment member 102. It should be noted that other types of biasing means including the use of other types of springs are contemplated by the inventor and thus come under the purview of this invention.

The invention has been described with reference to a preferred embodiment. Obviously, modifications and alterations will occur to others upon a reading and understanding of this specification. It is intended to include all such modifications and alternations in so far as they come within the scope of the appended claims or the equivalence thereof.

Having thus described the invention, it is now claimed:

1. A tiller assembly for use with associated soil, said tiller assembly comprising:

a tine assembly rotatably connected to a tiller body, said tine assembly including at least a first tine for use in tilling the associated soil;

a roller assembly comprising,
 (a) a roller frame operatively connected to said tiller body;
 (b) a roller rotatably connected to said roller frame, said roller having a contact surface for use in repacking the tilled associated soil;
 (c) biasing means for use in maintaining said roller against the associated soil, said biasing means permitting said roller frame to move with respect to said tiller body;
 (d) an adjustment member having a plurality of openings, said adjustment member being operatively connected to said roller frame for positioning said roller assembly into a plurality of positions with respect to said tiller body;
 (e) a pivot rod mounted to said tiller body;
 (f) at least a first attachment bracket having a first end operatively connected to said roller frame and a second end with an opening that rotatably receives said pivot rod;

wherein said biasing means includes at least a first torsion spring that receives said pivot rod, said at least first torsion spring having a first end operatively connected to said tiller body and a second end operatively connected to said at least first attachment bracket; and
 (g) a U-shaped pin having a first leg rotatably received within said at least first attachment bracket and a second end that is selectively received within any one of said plurality of openings in said adjustment member.

2. The tiller assembly of claim 1 wherein at least one of said openings is effective to position said roller assembly above said soil when the use of said roller assembly is not required.

* * * * *